July 29, 1930.  J. A. PATTERSON  1,771,860
RIM TOOL
Filed Sept. 25, 1929
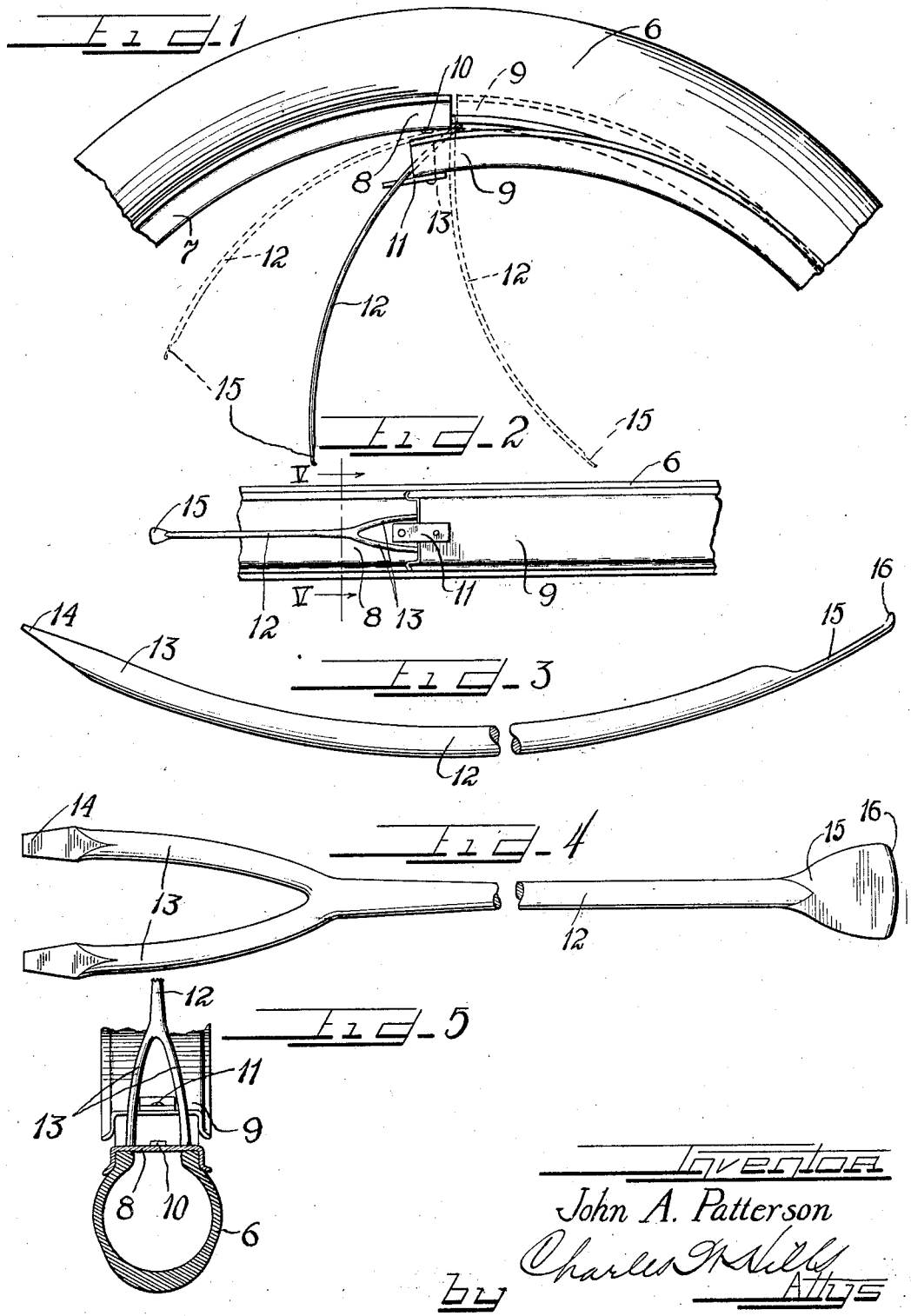
Inventor
John A. Patterson
by Charles... Attys Patented July 29, 1930

1,771,860

UNITED STATES PATENT OFFICE

JOHN A. PATTERSON, OF VILLA PARK, ILLINOIS

RIM TOOL

Application filed September 25, 1929. Serial No. 394,978.

This invention relates to improvements in a rim tool, and more particularly to a rim tool of a type highly desirable for moving the ends of a rim designed to support pneumatic tires to and from overlapping position, although the device may be used for adjusting any form of resilient band or in many other and various ways as will be apparent to one skilled in the art.

The present invention has been designed to provide a rim tool which may be readily and easily inserted between adjacent ends of a rim, and can be operated in such a manner that a single motion of the tool is sufficient to overlap the ends of a rim or to restore these ends in their original position of substantial abutment.

This invention also seeks the provision of a rim tool embodying only a single member which is capable of being manipulated in one operation to overlap or expand the ends of a rim, or some similar resilient band.

Still another object of the present invention is to provide a rim tool which may be easily and readily inserted between adjacent ends of a rim without being interfered with in any manner or necessitating any adjustments by and with relation to the lug and projection commonly provided on the rim, the tool also being shaped to permit very expeditious actuation thereof, at the same time leaving an abundance of room for the hands of the operator.

While some of the more salient features, characteristics, and advantages of a device embodying principles of this invention have been above pointed out, others will become apparent from the following disclosure.

The invention includes these and other features of construction and combinations of parts hereinafter described, and shown in a preferred form in the drawings, as more particularly indicated by the claim.

On the drawings:

Figure 1 is a fragmentary view in elevation of a rim and tire showing an implement embodying principles of the present invention in operative association with overlapped ends of the rim, and indicating the operation of the implement.

Figure 2 is a fragmentary bottom plan view of the central portion of the structure shown in Figure 1, with the implement in a slightly different position.

Figure 3 is an enlarged fragmentary side elevational view of an implement embodying principles of this invention.

Figure 4 is an enlarged fragmentary top plan view of the instrument shown in Figure 3.

Figure 5 is a vertical sectional view of the rim, tire and implement in inverted position, taken substantially as indicated by the line V—V of Figure 2.

As shown on the drawings:

In the structure selected to illustrate an embodiment of the present invention, there is shown a common form of pneumatic tire 6 and the customary resilient metallic rim 7 for holding this tire in proper position. The rim 7 is shown with its respective ends 8 and 9 in overlapping position just prior to the expanding of these ends into their normal position where they substantially abut each other and securely hold the tire thereon. The end 8 of the rim 7 is provided with the customary inward projection 10, and the end 9 of the rim is provided with the customary lug 11 suitably apertured for engaging over the projection 10.

The illustrated embodiment of the present invention includes a rim tool comprising a curved or arcuate shank 12 terminating at one end thereof in a forked or bifurcated end in the nature of a pair of spaced prongs 13, each of which is preferably formed with a flat nose or sharpened as indicated at 14. These prongs 13 are preferably a continuation of the curvature or arcuate formation of the shank 12.

At the opposite end thereof, the shank 12 terminates in a flattened web-like portion 15 having an inwardly curled rim 16 adjacent the outer extremity thereof. This portion 15 is in the nature of a commonly known tire tool for aiding in the removal of a tire from a rim.

In operation, the present invention is extremely simple, though none the less positive and effective. Assuming now that the ends 8 and 9 of the rim are in overlapped position as seen in Figure 1, the tire 6 having been just placed therearound and that it is desired to expand the rim ends into their substantially abutting position for properly holding the tire, it is simply necessary to insert the prongs 13 of the rim tool between the overlapping ends of the rim in the position indicated by the dotted lines at the left of Figure 1. It will be noted that prongs 13 effectively straddle the projection 10 on the end 8 and the lug 11 on the end 9 of the rim, so that these portions afford no opposition whatever to the manipulation of the rim tool, and any adjustments relative to these portions are totally eliminated in the present invention. The forward portions of the prongs 13 engage the ends of the rim end 8, and the edge of the rim end 9 is engaged by the prongs at a more rearward point. It is, therefore, apparent that a short movement of the tool, substantially to the full line position in Figure 1 is sufficient to establish a positive connection between the tool and rim ends, and a continuation of this movement to the position shown by the dotted lines to the right in Figure 1 is sufficient to force the rim ends into position for substantially abutting each other, as indicated by the dotted lines of the rim end 9. When the rim ends have assumed this position, due to the manipulation of the tool, it is a simple expedient, due to the sharpened tips 14 of the prongs, to remove the tool, the lug 11 properly engaging the projection 10 simultaneously with the removal of the tool. Of course, this entire operation is very simply and expeditiously done, it being substantially only a single motion with the tool. In other words, it is simply necessary for the operator to grasp the shank 12, jam the prongs between the overlapped ends of the rim, and swing the tool to the right in Figure 1 to expand the rim ends into normal position for holding the tire.

In the event it is desired to move the rim ends from their normal substantially abutting position into the overlapped position, it is simply necessary to force the sharpened ends 14 of the prongs 13 between the rim ends and actuate the tool in the reverse of the just previously described manner, continually forcing the tool inwardly until the rim ends have overlapped.

It might be well to also mention at this point that in some cases it is found expedient to utilize the flattened portion 15 at the opposite end of the shank 12 for moving the rim ends into their overlapped position. This is simply accomplished by inserting the inwardly bent end 16 of the portion 15 between the rim ends and prying the ends apart with the tool.

From the foregoing, it will be apparent that I have provided a rim tool capable of readily, easily, and very rapidly expanding or overlapping the ends of a resilient metal band or rim. Moreover, the tool is extremely light in weight, may be manipulated with great facility, and reduces the danger of injury either to the tire, inner tube, or rim to a minimum. Furthermore, this device is very durable, may be made in one piece, and can be economically manufactured.

I am aware that numerous details of construction may be varied through a wide range without departing from the principles of this invention, and I, therefore, do not purpose limiting the patent granted, otherwise than necessitated by the prior art.

I claim:

As an article of manufacture, a rim tool for restoring overlapped ends of a circular rim to their normal substantially abutting position comprising a shank and handle portion and spaced furcations on an end of said shank portion formed with a sufficient distance separating them as to enable them to straddle a lug on an end of said rim overlapping the other end of the rim, each of said furcations having its free end formed so as to present a thin portion for insertion between said overlapping rim ends whereby the leverage of said shank portion may be utilized upon a single motion of said shank portion to pry said overlapping end into its normal position, said shank portion and furcations being curved and their curvature being such that the tool will be out of parallel with the circle of the rim when said furcations are inserted between the overlapping rim ends and whereby the furcations may be inserted with facility between said rim ends.

In testimony whereof I have hereunto subscribed my name at Villa Park, Du Page County, Illinois.

JOHN A. PATTERSON.